United States Patent
Dodson et al.

(10) Patent No.: US 7,213,169 B2
(45) Date of Patent: **\*May 1, 2007**

(54) METHOD AND APPARATUS FOR PERFORMING IMPRECISE BUS TRACING IN A DATA PROCESSING SYSTEM HAVING A DISTRIBUTED MEMORY

(75) Inventors: John Steven Dodson, Pflugerville, TX (US); Michael Stephen Floyd, Austin, TX (US); Jerry Don Lewis, Round Rock, TX (US); Gary Alan Morrison, Austin, TX (US)

(73) Assignee: International Business Machines Corporation, Armonk, NY (US)

(\*) Notice: Subject to any disclaimer, the term of this patent is extended or adjusted under 35 U.S.C. 154(b) by 537 days.

This patent is subject to a terminal disclaimer.

(21) Appl. No.: 10/406,650

(22) Filed: Apr. 3, 2003

(65) Prior Publication Data
US 2004/0199823 A1    Oct. 7, 2004

(51) Int. Cl.
*G06F 11/00* (2006.01)
(52) U.S. Cl. ...................................................... 714/30
(58) Field of Classification Search .................. None
See application file for complete search history.

(56) References Cited

U.S. PATENT DOCUMENTS

| | | | | |
|---|---|---|---|---|
| 4,279,022 A | * | 7/1981 | Abe ........................... 708/110 |
| 4,396,995 A | * | 8/1983 | Grau ........................... 714/49 |
| 4,716,438 A | * | 12/1987 | Farrell ......................... 399/84 |
| 5,036,334 A | * | 7/1991 | Henderson et al. .......... 342/460 |
| 5,119,485 A | * | 6/1992 | Ledbetter et al. ........... 711/146 |
| 5,297,277 A | * | 3/1994 | Dein et al. ...................... 714/45 |
| 5,440,752 A | * | 8/1995 | Lentz et al. .................. 711/154 |
| 5,483,640 A | * | 1/1996 | Isfeld et al. .................. 709/213 |
| 5,642,479 A | * | 6/1997 | Flynn ........................... 714/45 |
| 5,657,253 A | * | 8/1997 | Dreyer et al. ................ 702/186 |
| 5,850,512 A | * | 12/1998 | Song ............................ 714/43 |
| 5,903,912 A | * | 5/1999 | Hansen ........................ 711/154 |
| 6,119,254 A | * | 9/2000 | Assouad et al. ............. 714/724 |
| 6,202,103 B1 | * | 3/2001 | Vonbank et al. .............. 710/15 |
| 6,295,587 B1 | * | 9/2001 | Martin et al. ................ 711/154 |
| 6,438,715 B1 | * | 8/2002 | Assouad ....................... 714/45 |
| 6,513,057 B1 | * | 1/2003 | McCrory ..................... 718/102 |
| 7,020,808 B2 | * | 3/2006 | Sato et al. ..................... 714/47 |

\* cited by examiner

*Primary Examiner*—Robert Beausoliel
*Assistant Examiner*—Elmira Mehrmanesh
(74) *Attorney, Agent, or Firm*—Casimer K. Salys; Dillon & Yudell LLP

(57) ABSTRACT

An apparatus for performing imprecise bus tracing in a distributed memory symmetric multiprocessor system is disclosed. The apparatus includes a bus trace macro (BTM) module that can control the snoop traffic seen by one or more of the memory controllers in the data processing system and utilize a local memory attached to the memory controller for storing trace records. After the BTM module is enabled for tracing operations, the BTM module snoops transactions on the interconnect and packs information contained within these transactions into a block of data of a size that matches the write buffers within the memory controller. In addition, the BTM module also includes a dropped record counter for counting the number of address transactions that were not converted to trace records because all the write buffers were completely full. After an occurence of the write buffers full condition, a time stamp trace record is inserted before a new trace record can be written. The time stamp trace record includes a count of the number of address transactions that were not converted to trace records.

5 Claims, 3 Drawing Sheets

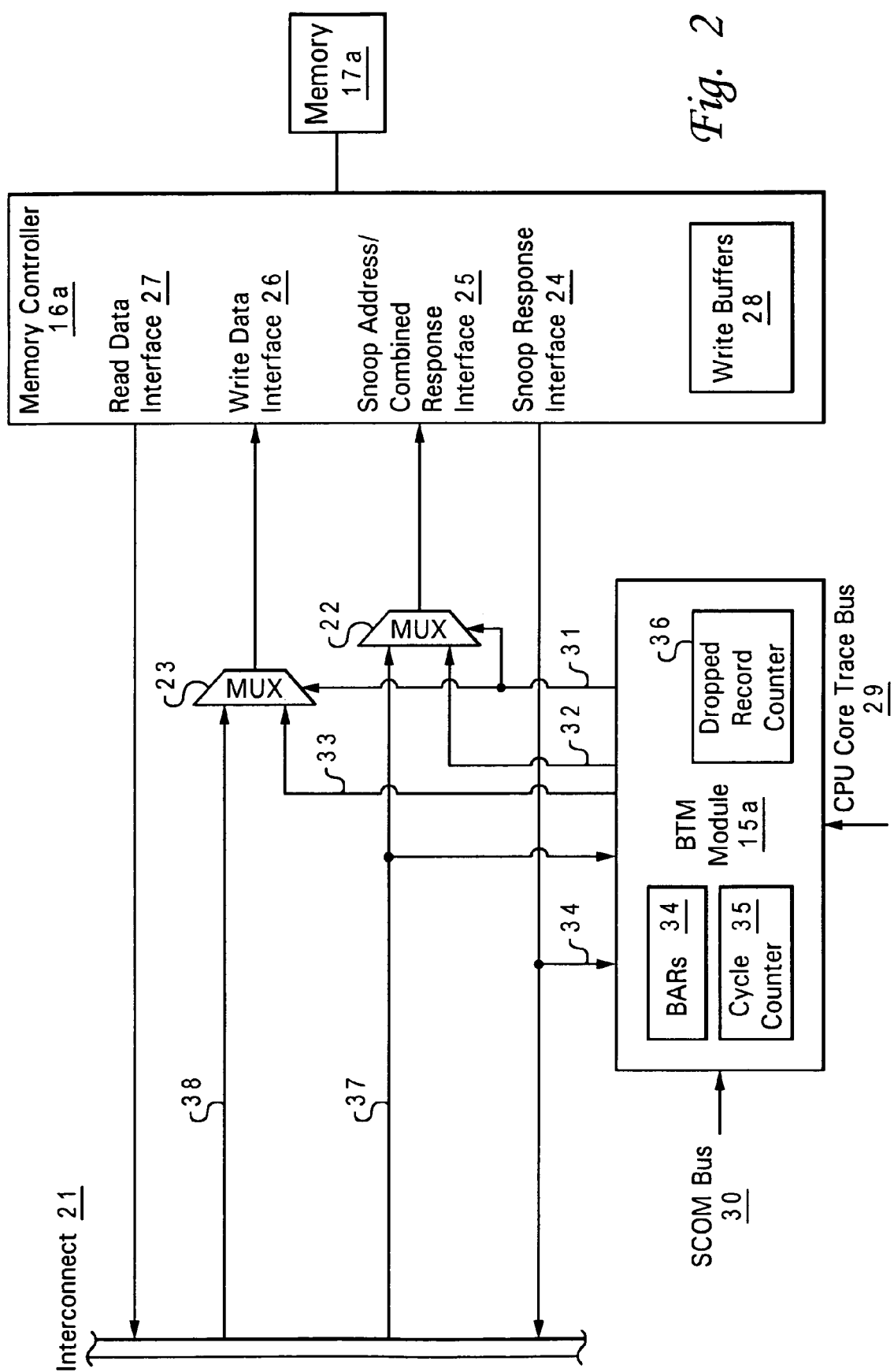

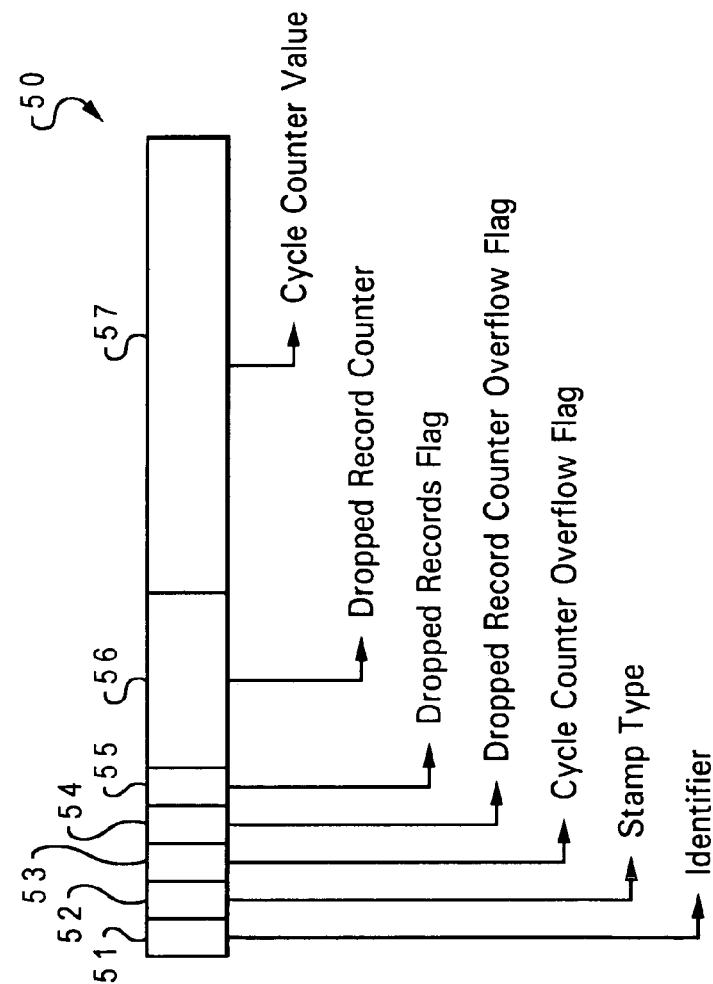

METHOD AND APPARATUS FOR PERFORMING IMPRECISE BUS TRACING IN A DATA PROCESSING SYSTEM HAVING A DISTRIBUTED MEMORY

RELATED PATENT APPLICATIONS

The present patent application is related to copending applications:
1. U.S. Ser. No. 10/406,661, filed on even date; and
2. U.S. Ser. No. 10/406,649, filed on even date.

BACKGROUND OF THE INVENTION

1. Technical Field

The present invention relates to system debugging in general, and, in particular, to a method and apparatus for performing interconnect tracing. Still more particularly, the present disclosure relates to a method and apparatus for performing bus tracing in a data processing system having a distributed memory.

2. Description of the Related Art

As technology progresses, the amount of circuitry that needs to be integrated onto a single chip is ever increasing. Also, state of the art technologies now routinely allow for the packaging of multiple chips on a single module substrate. In addition, higher operating clock frequencies are utilized both inside chips and on interconnects between chips. While all of the above-mentioned advancements lead to systems with higher performance, they also present some very difficult problems during system development.

Typically, before a new system can be brought to market, the system must be tested in a laboratory environment in order find any logical and/or electrical defects that may exist in the hardware design of the system. The capturing of lengthy traces of interconnect (or bus) transactions is routinely required to isolate some of the defects. Also, extensive performance modeling and analysis are required during system development to fine tune design points such that the maximum possible performance can be achieved. The capturing of traces that represent typical instruction sequences used by many common applications, such as commercial database applications, is required as part of the performance modeling and analysis. Sometimes, those traces have to be very lengthy in order to adequately represent the target commercial applications.

Traditionally, the collection of traces has been performed by attaching several logic analyzers external to interconnects. The logic analyzers must be capable of sampling data at the same speed as the interconnects to which they are connected and must have very large memories to store lengthy traces. With the technological advances described above, the traditional method of collecting traces has become unworkable for several reasons. First, the speed of interconnects have increased to the point that most off-the-shelf logic analyzers are not fast enough for sampling data reliably, and those that can are prohibitively expensive. Second, even with logic analyzers that can perform at high speed, the increased loading on interconnects caused by the attached logic analyzers can degrade the integrity of the interconnects to a point that the interconnects cease to function at the desired frequency. Third, with the modern packaging technology, interconnects tend to be imbedded within a single chip and/or within a multichip module. Thus, even if the above-mentioned two problems can be overcome, it does no good when interconnects are not accessible externally.

One conventional method of (partially) solving the above-mentioned problems has been relying upon the integration of small memory arrays at various key locations on a chip to allow for the sampling of various interconnects internally. The problem with such method is that the memory arrays have to be very small in size, which means limited storage capacity, because of the cost of additional silicon areas. Even with the use of advanced data compression techniques, the storage capacity of those small memory arrays are still nowhere near the storage capacity that is considered to be useful for debugging complex sequences or collecting traces suitable for performance analysis.

Consequently, it would be desirable to provide a method and apparatus for collecting lengthy core instruction traces or interconnect traces without the use of externally attached logic analyzers or additional on-chip small memory arrays.

SUMMARY OF THE INVENTION

In accordance with a preferred embodiment of the present invention, a distributed memory symmetric multiprocessor system includes multiple processing units, each coupled to a memory module. Each of the processing units includes a memory controller and a bus trace macro (BTM) module. The memory controller is coupled to an interconnect for the symmetric multiprocessor system, and the BTM module is connected between the interconnect and the memory controller via two multiplexors. The BTM module selectively intercepts address transactions from the interconnect and converts the intercepted address transactions to corresponding trace records. The BTM module then writes the trace records to a set of write buffers contained within the memory controller. In addition, the BTM module also includes a dropped record counter for counting the number of address transactions that were not converted to trace records because all the write buffers were completely full. After an occurence of the write buffers full condition, a time stamp trace record is inserted before a new trace record can be written. The time stamp trace record includes a count of the number of address transactions that were not converted to trace records.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2 is a block diagram of a bus trace macro module and a memory controller within one of the processing units of the symmetric multiprocessor system from FIG. 1, in accordance with a preferred embodiment of the present invention;

FIG. 3 is a diagram of a trace record format for interconnect transactions, in accordance with a preferred embodiment of the present invention; and FIG. 4 is a diagram of a time stamp record format, in accordance with a preferred embodiment of the present invention.

DETAILED DESCRIPTION OF A PREFERRED EMBODIMENT

I. Disturbed Memory System

Figure 1:
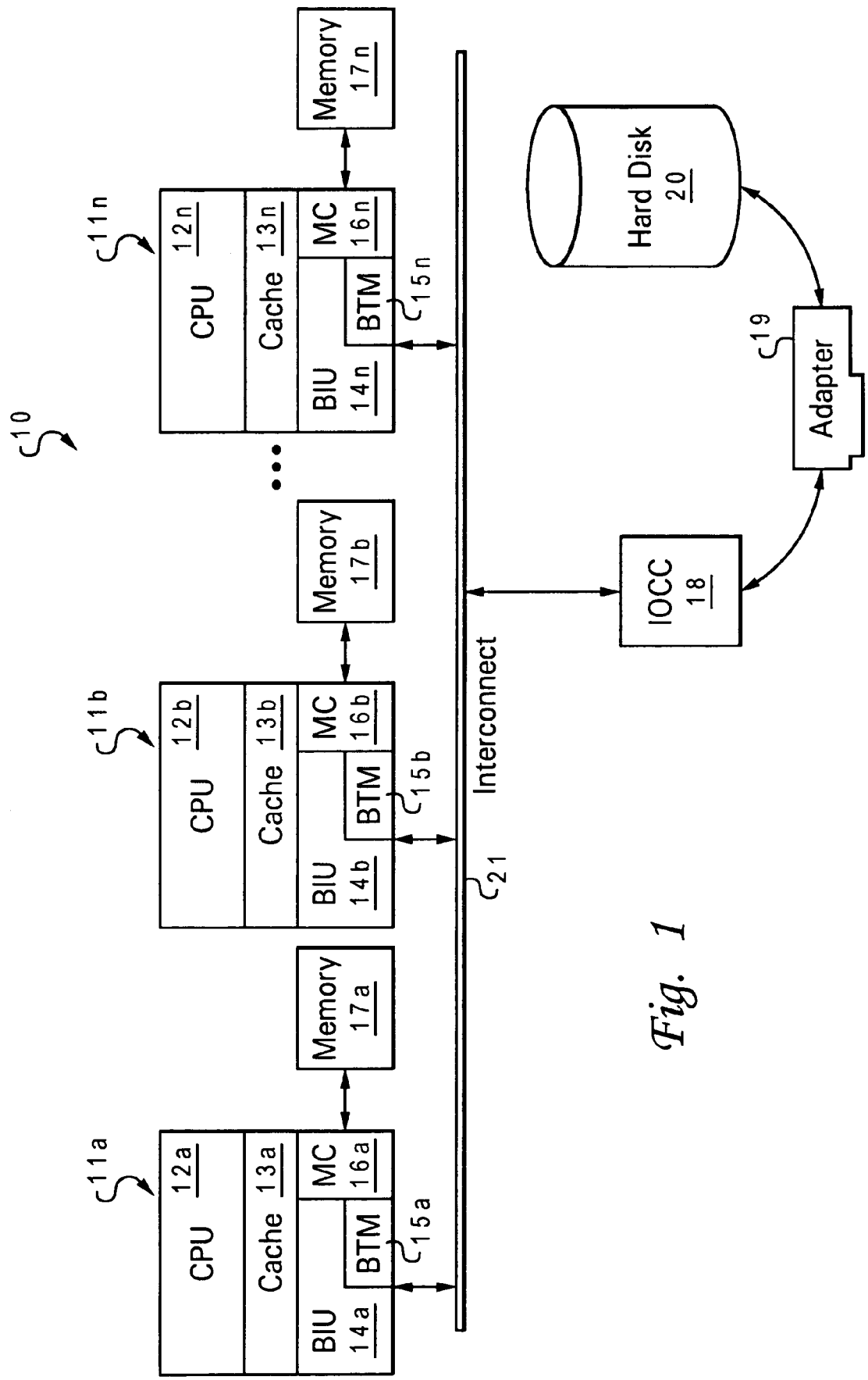
FIG. 1 is a block diagram of a symmetric multiprocessor system in which a preferred embodiment of the present invention is incorporated.

Referring now to the drawings and in particular to FIG. 1, there is depicted a block diagram of a symmetric multiprocessor (SMP) system in which a preferred embodiment of the present invention is incorporated. As shown, a SMP system 10 includes processing units 11a–11n connected to each other via an interconnect 21. Each of processing units 11a–11n includes a central processing unit (CPU), a cache memory, a bus interface unit (BIU), a bus trace macro (BTM) module and a memory controller. For example, processing unit 11a includes a CPU 12a, a cache memory 13a, a BIU 14a, a BTM module 15a and a memory controller 16a; processing unit 11b includes a CPU 12b, a cache memory 13b, a BIU 14b, a BTM module 15b and a memory controller 16b; etc. Each of processing units 11a–11n is coupled to a memory module via its respective memory controller. For example, processing unit 11a is coupled to a memory module 17a via memory controller 16a; processing unit 11b is coupled to a memory module 17b via memory controller 16b; etc. SMP system 10 also includes a hard disk 20 coupled to interconnect 21 via an input/output channel converter (IOCC) 18 and a hard disk adapter 19.

In the present embodiment, the total system memory of SMP system 10 is distributed among memory modules 17a–17n controlled by their respective memory controller. The operating system controls which portions of the total system memory are accessible by various application software.

II. Tracing Apparatus

As a preferred embodiment of the present invention, BTM modules 15a–15n and memory controllers 16a–16n are utilized to facilitate core tracing and interconnect tracing. Since all BTM modules 15a–15n provide corresponding functions, and all memory controllers 16a–16n provide corresponding functions; thus, only BTM module 15a and memory controller 16a are further described in details. With reference now to FIG. 2, there is illustrated a block diagram of BTM module 15a coupled to memory controller 16a, in accordance with a preferred embodiment of the present invention. BTM module 15a is capable of receiving either transaction information from interconnect 21 or CPU core tracing information from CPU core trace bus 29 at any given time. Tracing operations for BTM module 15a is controlled by software commands via a serial communication (SCOM) bus 30.

Memory controller 16a, which is also coupled to memory module 17a, includes a snoop response interface 24, a snoop address/combined response interface 25, a write data interface 26, and a read data interface 27. Typically, after snooping transaction information from interconnect 21, memory controller 16a may provide a snoop response to interconnect 21 via snoop response interface 24 when appropriate. In addition, memory controller 16a receives write information from interconnect 21 via write data interface 26, and sends read information to interconnect 21 via read data interface 27. Memory controller 16a also includes several write buffers 28 for temporarily storing write data prior to forwarding the write data to memory module 17a.

As a preferred embodiment of the present invention, multiplexors 22 and 23 are utilized to intercept transaction information from interconnect 21 for BTM module 15a. Multiplexor 22 is placed in the path between a snoop address/combined response bus 37 from interconnect 21 and snoop address/combined response interface 25 for memory controller 16a. Similarly, multiplexor 23 is placed in the path between an inbound write data/control bus 38 from interconnect 21 and write data interface 26 for memory controller 16a.

During interconnect tracing, BTM module 15a controls what transaction operations on interconnect 21 are visible to memory controller 16a on its snoop address/combined response interface 25 and write data interface 26 through multiplexors 22 and 23, respectively. In the present embodiment, BTM module 15a may prevent transaction operations from reaching snoop address/combined response interface 25 of memory controller 16a by using a select line 31 to multiplexor 22. Similarly, BTM module 15a may prevent write information from reaching write data interface 26 of memory controller 16a via select line 31 to multiplexor 23.

On the other hand, BTM module 15a can provide its own information to memory controller 16a through multiplexors 22 and 23. In the present embodiment, BTM module 15a can allocate write queues and their corresponding write buffers 28 within memory controller 16a via write line 32 and multiplexor 22. Similarly, BTM module 15a can write trace records to write buffers 28 within memory controller 16a via write line 33 and multiplexor 23.

III. Basic Tracing Operations

In order to enable interconnect tracing, BTM module 15a is initially configured by software via SCOM bus 30 to set an enable bit (not shown) within BTM module 15a. The initial configuration also includes loading an address range to a base address register (BAR) 34 within BTM module 15a to match the real memory address range with which memory controller 16a is initially configured for memory module 17a during system initialization. Such address range is a single contiguous portion of the entire system memory address space for SMP system 10 (from FIG. 1). After tracing has been enabled, the operating system prevents any other software application from accessing memory controller 16a and memory module 17a (other software applications can still access the memory modules attached to the other memory controllers in SMP system 10, such as memory modules 17b–17n). The configuration sequence also instructs BTM module 15a to direct multiplexors 22 and 23 via select line 31 to begin interception operations such that snoop address/combined response interface 25 and write data interface 26 for memory controller 16a cannot receive transaction information directly from interconnect 21.

Before tracing can begin, BTM module 15a sends write commands to memory controller 16a that are queued within write buffers 28. The addresses associated with those write commands are sequential, starting at the beginning of the memory space configured to memory controller 16a. Then, the queued write operations waits for the associated write data packets to arrive on write data interface 26.

Tracing begins when BTM module 15a is ready to snoop interconnect 21 for any valid address transactions. When a valid address transaction is detected, BTM module 15a generates a trace record from the detected address transaction and then writes the trace record to one of write buffers 28 within memory controller 16a via write data interface 26.

As more address transactions are being snooped form interconnect 21, BTM module 15a continues to send their corresponding trace records to write buffers 28 within memory controller 16a. When one of write buffers 28 is filled up, BTM module 15a moves on to a next one of write buffers 28. As write buffers free up upon completion of the memory write, BTM module 15a sends write commands to memory controller 16a to reuse write buffers as they are being free up. Once one of write buffers 28 has been filled, memory controller 16a proceeds to move trace records from that one of write buffers 28 to memory module 17a. Before sending a write command to memory controller 16a, BTM module 15a monitors snoop response interface 24 via a read line 34 to determine if memory controller 16a can accept a new write command at the time. The write command/write data process continues in a pipelined manner until either a preconfigured stopping point is reached, or a command is issued by software (via SCOM bus 30) to instruct BTM module 15a to stop tracing.

After the tracing has been stopped, software instructs BTM module 15a to direct multiplexors 22 and 23 to stop the intercept operations such that snoop address/combined response interface 25 and write data interface 26 for memory controller 16a can receive transaction information directly from interconnect 21. As a result, memory controller 16a can again snoop transaction information directly from interconnect 21 like any other memory controller within SMP system 10. At this point, the software may access the trace records that are stored in memory module 17a. The software may either process the trace records immediately or move the trace records to hard disk 20 (from FIG. 1) for future processing.

CPU core traces are basically collected by BTM module 15a in much the same manner as interconnect traces described above. The difference is that the source for CPU core traces is CPU core trace bus 29 instead of interconnect 21. Also, BTM module 15a can only collect either interconnect traces or CPU core traces at any given time but not both at the same time.

IV. Increasing Tracing Bandwidth

In some cases, especially in larger SMP systems, a single BTM module and the corresponding memory controller may not be able to store trace records into their associated "local" memory module as fast as the ongoing interconnect transactions that are being snooped. As a result, some interconnect transactions may not have their corresponding trace records stored anywhere. Although sometimes it is acceptable to skip a minimum amount of trace information for a given SMP system configuration, it is much more preferable to have a complete trace record coverage for the entire interconnect usage. Thus, the above-mentioned basic tracing operations would be even more useful if expanded to provide additional tracing bandwidth to minimize or prevent trace overruns in larger SMP systems having higher interconnect utilization.

As a preferred embodiment of the present invention, more than one BTM module can be simultaneously enabled to distribute the burden of collecting trace information across multiple processing units within a relatively large SMP system having 32 memory controllers or more. The bandwidth scalability can be achieved by enabling multiple BTM modules for interconnect tracing. Each of the enabled BTM modules is configured to only store trace records for a subset of all interconnect transactions within the entire SMP system.

Using a relatively large SMP system having 32 memory controllers as an example, if two BTM modules of the SMP system are enabled for performing interconnect tracing in order to keep up with the peak interconnect utilization, then one BTM module can be configured to only handle interconnect transactions snooped in even cycles, and the other BTM module can be configured to only handle interconnect transactions snooped in odd cycles. This way, each of the BTM modules and its associated memory controller only has to be able to handle half as much bus activities as a single BTM module working alone. The remaining 30 memory controllers (along with their associated BTM modules that are not enabled for interconnect tracing) are still usable by application software for other normal computing activities. Using the same principle, if four BTM modules and four associated memory controllers are enabled to provide interconnect tracing, ten each of the four BTM modules can be configured to trace a different one of the four cycle time slices.

In addition to the above-mentioned method that is based on time slicing, the distribution of the interconnect tracing workload can also be based on other criteria. The distribution of the interconnect tracing workload can be based on, for example, addresses (i.e., even addresses, odd addresses, specific contiguous address ranges, etc.), CPU identifications (IDs) (i.e., transactions sourced by even CPU IDs, odd CPU IDs, CPU IDs from a first ID through a second ID, etc.), transaction types (i.e., reads, writes, RWITMs, DClaims, etc.).

The mechanism used to provide interconnect tracing workload distribution includes configuration registers that can be set up by software prior to the beginning of trace operations. Each enabled BTM module can decode the contents of the configuration registers to determine which snooped interconnect transactions should be stored as trace records and which snooped interconnect transactions should be ignored. The idea is that a trace record for each interconnect transaction is generated by only one of the enabled BTM modules.

After the tracing operation has been completed, all the separate trace records gathered from different memory modules that were used for tracing can be merged together by software based on time stamps to generate a single trace record of all interconnect activities within a time window that tracing operation was performed.

V. Reduced Tracing Bandwidth

Prior art interconnect tracing methods have no means for implementing interconnect trace collection engines that have a trace record collection and storage rate that are lower than the peak bus utilization. As a result, the prior art interconnect tracing methods must be able to keep up with peak bus utilizations. Such capability unnecessarily adds cost and complexity in cases where such capability may not be needed. Hence, it is certainly desirable to increase tracing bandwidth (by enabling multiple BTM modules as described supra) for cases where precision is required, but it is also desirable to reduce tracing bandwidth for cases where the loss of a few trace records here and there is considered as acceptable, such as some logic debug scenarios and cases where statistical sampling of bus activity is sufficient. Furthermore, in system configurations that have a limited amount of total system memory, the BTM module scaling method will also be limited. Therefore, a means to store trace records where interconnect transactions were dropped is desirable.

Referring now to FIG. 3, there is illustrated a diagram of a trace record format for interconnect transactions, in accordance with a preferred embodiment of the present invention. As shown, a trace record 40 includes an identifier field 41, a transaction type field 42, a transaction size field 43, a tag field 44, an address field 45, and a combined response field 46. Identifier field indicates 41 the type of record, that is, whether it is a trace record or a time stamp record. Transaction type field 42 indicates the type of interconnect transaction. Transaction size field 43 indicates the size of the interconnect transaction. Tag field 44 indicates the source of the interconnect transaction. Address field 45 indicates the real memory address for the interconnect transaction. Combined response field 46 indicates the combined response for the interconnect transaction, if necessary. Although only a trace record format for interconnect transactions is illustrated, it is understood by those skilled in the art that a trace record format for core transactions is relatively similar.

As a preferred embodiment of the present invention, a stamp generation mechanism is included within a BTM module, such as BTM module 15*a* from FIG. 2, where time stamp records are injected into the trace information only when there are idle cycles between interconnect transactions. In addition to normal time stamping, such time stamp records are also used to provide a count of the number of interconnect transactions missed since the previous trace record due to a write buffers full condition.

With reference now to FIG. 4, there is illustrated a diagram of a time stamp trace record format, in accordance with a preferred embodiment of the present invention. As shown, a time stamp trace record 50 include an identifier field 51, a stamp type field 52, a cycle counter overflow field 53, a dropped record counter overflow field 54, a dropped records field 55, a dropped record counter field 56 and a cycle counter value field 57.

When interconnect tracing begins, a time stamp trace record 50 having its start stamp field 52 set is inserted by BTM module 15*a* to the beginning of a trace record. Start stamp field 52 allows the post-processing software to parse trace records that were collected in a continuous wrap mode or in a single sample mode with multiple starts/stops.

BTM module 15*a* contains a cycle counter 35 (from FIG. 2) for counting how many consecutive idle cycles have occurred since an interconnect transaction. When the next interconnect transaction appears, BTM module 15*a* inserts one time stamp trace record 50 having the idle cycle count included in cycle counter value field 57 prior to storing the trace record for the next interconnect transaction. If cycle counter 35 reaches its maximum value before the next interconnect transaction appears, there is a mode select that determines the action that needs to be taken. In a first mode, a cycle counter overflow flag is set in cycle counter overflow field 53 and cycle counter 35 rolls over and continues to count. When the next bus transaction appears, the time stamp log contains the cycle counter overflow flag in addition to the cycle count value. In a second mode, a time stamp is recorded with the idle cycle count at its maximum value. Then, cycle counter 35 is reset and starts counting anew. In the second mode, there is a time stamp logged for each N consecutive idle cycles, where N is the maximum count value for cycle counter 35 being idle.

Depending on the rate at which a memory controller, such as memory controller 16*a* from FIG. 2, can store blocks of trace records to a corresponding memory module, such as memory module 17*a* from FIG. 2, and the rate at which snooped interconnect transactions are seen by BTM module 15*a*, there may be short periods of time where all write buffers 28 within memory controller 16*a* are filled. During such time intervals, BTM module 15*a* is unable to store trace records. For some usages of bus records, the fact that some trace records are dropped is not a problem as long as information of how many records were dropped and how many cycles lapsed between the previous trace record (or time stamp) stored and the next trace record (or time stamp) stored can be provided in the trace record in some manner.

The information is provided by utilizing a dropped record counter 36 (from FIG. 2) in BTM module 15 in addition to cycle counter 35. When BTM module 15*a* receives a write buffer full indication from memory controller 16*a*, BTM module 15*a* uses cycle counter 35 to count the number of cycles lapsed while write buffers 28 are under a full condition. Any interconnect transaction snooped during the write buffers full condition causes dropped record counter 36 to be incremented. After the write buffers full condition has ended, BTM module 15*a* stores the number of dropped records and the number of cycles that lapsed while the records were being dropped in dropped record counter field 56 and cycle counter field 57, respectively. If dropped cycle counter 36 overflows during the write buffers full condition, a flag is set in dropped record record field 55, indicating that dropped cycle counter 36 is overflowed. If the number of cycles lapsed during the write buffers full condition exceeds the maximum cycle count, a flag is set in cycle counter overflow field 53 to indicate that cycle counter 35 is overflowed. Thus, time stamp trace record 50 provides the number of records dropped since the last trace record (or time stamp) was stored. Time stamp trace record 50 also provides the number of cycles that have passed since the last trace record (or time stamp) just like the normal time stamp described above.

When one interconnect transaction is snooped in every bus cycle and a corresponding trace record is generated and stored for each interconnect transaction, then no time stamp is required to be stored along with the trace records or between them. In essence, two consecutive trace records implies that two corresponding interconnect transactions occurred in two consecutive bus cycles.

As has been described, the present invention provides a method and apparatus for performing in-memory instruction/bus tracing in a distributed memory SMP system. With the present invention, no external hardware, such as logic analyzers, is required for perform instruction/bus tracing. Thus, no extra electrical loading is placed on interconnects that could limit their operating frequency. Also, no on-chip memory arrays are required for storing trace information. With the present invention, all hardware required for tracing is confined to one or more BTM modules. Since BTM modules are completely external to memory controllers, memory controllers have no knowledge that any BTM module is being used for performing tracing operations, which reduces the complexity of the memory controller design. The present invention also allows for the storage of trace records to a hard disk for subsequent offline processing.

While the invention has been particularly shown and described with reference to a preferred embodiment, it will be understood by those skilled in the art that various changes in form and detail may be made therein without departing from the spirit and scope of the invention.

What is claimed is:

1. An symmetric multiprocessor (SMP) system having an apparatus for performing bus tracing, said SMP system comprising:
   an interconnect;
   a plurality of memory modules that form a total system memory of said SMP system; and
   a plurality of substantially identical processing units coupled to said interconnect, wherein more than one of said processing units include:
   a memory controller coupled to one of said memory modules;
   a plurality of multiplexors;

a bus trace macro (BTM) module connected between said interconnect and said memory controller via said plurality of multiplexors located externally from said BTM module, wherein said BTM module selectively intercepts address transactions from said interconnect converts said intercepted address transactions to corresponding trace records, and writes said trace records to a write buffer within said memory controller;

a dropped record counter for counting the number of address transactions not converted to trace records due to said write buffer being full; and means for inserting a lime stamp trace record before writing a new trace record after an occurrence of said write buffer being full, wherein said time stamp trace record includes a count of said number of address transactions not converted to trace records.

2. The SMP system of claim 1, wherein said plurality of multiplexors prevent said address transactions from reaching said memory controller when said BTM module is performing said selective interception.

3. The SMP system of claim 1, wherein one of said multiplexors is placed in a path between a snoop address/combined response bus from said interconnect and a snoop address/combined response interface for said memory controller.

4. The SMP system of claim 3, wherein another one of said multiplexors is placed in a path between a data/control bus from said interconnect and a write data interface for said memory controller.

5. The SMP system of claim 1, wherein said BTM module includes a base address register for containing an address range that matches the real memory address range of said memory controller.

* * * * *